United States Patent
Bahramirad et al.

(10) Patent No.: US 11,551,176 B2
(45) Date of Patent: Jan. 10, 2023

(54) METHODS AND SYSTEMS FOR DETERMINING ECONOMIC VIABILITY OF MICROGRID

(71) Applicants: Commonwealth Edison Company, Chicago, IL (US); University of Denver, Denver, CO (US)

(72) Inventors: Shay Bahramirad, Oakbrook Terrace, IL (US); Amin Khodaei, Denver, CO (US)

(73) Assignees: Commonwealth Edison Company, Chicago, IL (US); University of Denver, Denver, CO (US)

( * ) Notice: Subject to any disclaimer, the term of this patent is extended or adjusted under 35 U.S.C. 154(b) by 436 days.

(21) Appl. No.: 15/749,199

(22) PCT Filed: Aug. 1, 2016

(86) PCT No.: PCT/US2016/045009
§ 371 (c)(1),
(2) Date: Jan. 31, 2018

(87) PCT Pub. No.: WO2017/023852
PCT Pub. Date: Feb. 9, 2017

(65) Prior Publication Data
US 2018/0225614 A1 Aug. 9, 2018

Related U.S. Application Data (60) Provisional application No. 62/199,689, filed on Jul. 31, 2015.

(51) Int. Cl.
| | | |
|---|---|---|
| *G06Q 10/06* | (2012.01) | |
| *G06Q 50/06* | (2012.01) | |
| *G06Q 30/02* | (2012.01) | |

(52) U.S. Cl.
CPC ....... *G06Q 10/06375* (2013.01); *G06Q 10/06* (2013.01); *G06Q 30/0206* (2013.01); *G06Q 50/06* (2013.01); *Y04S 50/14* (2013.01)

(58) Field of Classification Search
None
See application file for complete search history.

(56) References Cited

U.S. PATENT DOCUMENTS

| | | | |
|---|---|---|---|
| 8,751,036 B2 | 6/2014 | Darden et al. | |
| 2006/0276938 A1* | 12/2006 | Miller | H02J 3/00 700/295 |

(Continued)

FOREIGN PATENT DOCUMENTS

| | | |
|---|---|---|
| CA | 2994410 A1 | 2/2017 |
| EP | 3329456 A1 | 6/2018 |
| WO | WO-2017/023852 A1 | 2/2017 |

OTHER PUBLICATIONS

Phurailatpam et al. (Planning and optimization of autonomous DC microgrids for rural and urban applications in India, Renewable and Sustainable Energy Reviews, vol. 82, Part 1, Feb. 2018, pp. 194-204).*

(Continued)

*Primary Examiner* — Matthew D Henry
(74) *Attorney, Agent, or Firm* — Ballard Spahr LLP (57) ABSTRACT

Methods and systems for evaluating economic viability of a proposed microgrid, including uncertain variables are disclosed. One or more candidate distributed energy resources can be selected for use within a proposed microgrid. An investment cost and an operation cost of the one or more candidate distributed energy resources can be determined. A cost of drawing power from a main power grid can be compared to a sum of the investment cost and the operation cost of the one or more candidate distributed energy resources. The proposed microgrid can be identified for (Continued)

installation when the sum of the investment cost and the operation cost is less than the cost of drawing power from the main power grid.

20 Claims, 3 Drawing Sheets

(56) References Cited

U.S. PATENT DOCUMENTS

| | | | | |
|---|---|---|---|---|
| 2009/0319090 A1* | 12/2009 | Dillon | | G06Q 10/04 |
| | | | | 700/291 |
| 2010/0179704 A1* | 7/2010 | Ozog | | G06Q 50/06 |
| | | | | 700/291 |
| 2010/0332373 A1* | 12/2010 | Crabtree | | G06Q 40/04 |
| | | | | 705/37 |
| 2014/0039710 A1* | 2/2014 | Carter | | H02J 3/00 |
| | | | | 700/291 |
| 2014/0148963 A1* | 5/2014 | Ozog | | H02J 3/008 |
| | | | | 700/291 |
| 2015/0094968 A1* | 4/2015 | Jia | | G05B 15/02 |
| | | | | 702/60 |
| 2015/0261240 A1* | 9/2015 | Mokhtari | | H02J 3/48 |
| | | | | 700/291 |
| 2017/0031056 A1* | 2/2017 | Vega-Avila | | G01W 1/12 |
| 2018/0225614 A1 | 8/2018 | Bahramirad et al. | | |

OTHER PUBLICATIONS

International Search Report and Written Opinion dated Oct. 14, 2016 by the International Searching Authority for International Application No. PCT/US2016/045009, filed on Aug. 1, 2016 and published as WO 2017/023852 on Feb. 9, 2017 (Applicant-Commonwealth Edison Company) (7 Pages).

International Preliminary Report on Patentability dated Feb. 6, 2018 by the International Searching Authority for International Application No. PCT/US2016/045009, filed on Aug. 1, 2016 and published as WO 2017/023852 on Feb. 9, 2017 (Applicant-Commonwealth Edison Company) (6 Pages).

European Search Report and Written Opinion dated Dec. 13, 2018 by the European Patent Office for EP Application No. 16833679.0, filed on Aug. 1, 2016 and published as EP 3329456 on Jun. 6, 2018 (Applicant-Commonwealth Edison Company) (8 Pages).

Office Action issued in European Patent Application No. 16 833 679.0-1222, dated Oct. 18, 2021, 12 pages.

* cited by examiner

METHODS AND SYSTEMS FOR DETERMINING ECONOMIC VIABILITY OF MICROGRID

CROSS-REFERENCE TO RELATED APPLICATION

This Application is a national stage filing under 35 U.S.C. § 371 of International Application No. PCT/US2016/045009, filed on Aug. 1, 2016, which claims the benefit of U.S. Application No. 62/199,689, filed Jul. 31, 2015, which are incorporated herein by reference in their entirety.

BACKGROUND

Microgrids are localized power grids that can disconnect from a traditional (main) power grid to operate autonomously to help mitigate grid disturbances to strengthen grid resilience. Microgrids can continue operating while the main power grid is down, and can function as a grid resource for faster system response and recovery. Microgrids also support a flexible and efficient electric grid, by enabling the integration of growing deployments of renewable sources of energy. Microgrid generation resources can comprise fuel cells, wind, solar, or other energy sources. Multiple dispersed generation sources and an ability to isolate the microgrid from the main power grid provide highly reliable electric power. Additionally, produced heat from generation sources such as microturbines can be used for local process heating or space heating, allowing flexible tradeoffs between the needs for heat and electric power. Thus there are many advantages to microgrid power generation. However, high investment costs of microgrid operation and deployment are major obstacles to widespread and rapid deployment of this viable technology. An accurate assessment of microgrid economic benefits is a challenging task due to significant uncertain data involved in the assessment. Moreover, some of the assessment results such as reliability improvements are difficult to comprehend for customers when represented in supply availability terms. Thus, efficient planning models are required for ensuring the economic viability of microgrid deployments and further justifying investments based on cost-worth analyses in uncertain conditions. These and other issues are addressed in the present disclosure.

SUMMARY

It is to be understood that both the following general description and the following detailed description are exemplary and explanatory only and are not restrictive. Methods and systems are described herein for evaluating economic viability of a proposed microgrid accounting for uncertain data. The methods and systems can allow a user to select one or more distributed energy resources (DERs) as candidates for deployment in a proposed microgrid and evaluate whether the difference between the costs of providing power to customers on the microgrid using the DERs and the cost of providing power to the same customers using the main power grid over a specified planning horizon is greater than an investment cost to deploy the DERs.

In an aspect, one or more candidate distributed energy resources can be selected for use within a proposed microgrid. An investment cost and an operation cost of the one or more candidate distributed energy resources can be determined. A cost of drawing power from a main power grid can be compared to a sum of the investment cost and the operation cost of the one or more candidate distributed energy resources. The proposed microgrid can be identified for installation when the sum of the investment cost and the operation cost is less than the cost of drawing power from the main power grid.

In another aspect, one or more of characteristic information regarding one or more candidate distributed energy resources, costs related to one or more candidate distributed energy resources, a total budget, forecasts regarding energy costs, a budget, reliability levels, and a limit on uncertainty factors can be received. A list of distributed energy resources can be determined based on the one or more candidate distributed energy resources, the characteristic information, and the costs. Economic viability information related to a microgrid based on the received input and the determined list of distributed energy resources can then be output.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Microgrids, which were initially introduced to streamline operation and control of a large number of distributed energy resources (DERs) in distribution networks, can offer economic and reliability benefits to electricity customers. However, these benefits should be compared with the microgrid investment cost to help ensure a complete return on investment and justify microgrid deployments. However, because several factors related to the return on investment are uncertain, accurately estimating the return on investment can be difficult.

Forecasting a market price of electricity implicates a high degree of error as several uncertain factors can be involved in the forecasting process. For example, offers to buy and/or sell power to the microgrid by generation companies, transmission network congestion and losses, and customer participation with ability to respond to market prices can each produce uncertainty. The electricity market price (e.g., a real-time electricity price at a microgrid point of common coupling) can be a significant source of uncertainty in the microgrid planning as it considerably impacts the commitment and dispatch of microgrid DERs.

Microgrid DERs can require a higher investment cost compared to conventional energy resources. However, microgrid DERs can provide energy at a less expensive rate compared to the energy purchased from the main grid. In particular, at peak hours when the market price of electricity is high, DERs can produce energy for a price lower than the market price. Thus, a microgrid can significantly benefit from generating power using DERs at peak hours to supply local loads and selling excess power to the main grid at the market price. An energy storage system can also assist in promoting this objective as it can be charged when the energy market price is low- and discharged when the energy market price is high. The microgrid can also increase the reliability of a local energy supply in case of main grid disturbances. This can be particularly relevant in rural areas and in places where main grid reliability can be relatively low. If there is an outage in the main grid and the system is not able to supply the required energy loads, a load supply would be interrupted for maintaining the system operational feasibility (i.e., the load would be curtailed). However, islanding capability of the microgrid can help to ensure that local loads are supplied even if main grid power is not available. Economic benefits from selling back the excess power to the grid plus monetized reliability improvements can represent at least a portion of microgrid revenue. Accordingly, microgrid economic viability can ensured when the microgrid revenue during the planning horizon surpasses the investment cost.

Long-term microgrid load forecasting can be one source of uncertainty. A fixed load can be forecasted with an acceptable accuracy, since a fixed load resource produces power at a substantially constant rate with little or no interruption. However, the flexible load in microgrids cannot be easily forecasted, as it can depend on variations in one or more parameters, such as hourly prices and/or weather conditions. In an aspect a fixed load can comprise a unit (e.g., a DER) that can produce energy at a substantially constant rate, while a flexible load can comprise a unit (e.g., a DER) that can produce energy at a variable rate, based on one or more factors (e.g., weather related factors, load matching-based need, etc.).

Availability (e.g., output) of renewable energy from DERs can be another source of uncertainty. A high degree of renewable energy resources (e.g., wind energy, solar energy, etc.) can be utilized in microgrids. The renewable energy resources can produce a variable power output based on, for example, weather conditions. The power output of the renewable energy resources typically does not follow a repetitive pattern in the daily operation of microgrids. Accurate forecasting of power produced by renewable energy resources can be challenging as the generation highly depends on site and weather conditions.

Another type of uncertainty can be microgrid islanding (e.g., temporarily disconnecting the microgrid from the main power grid). A microgrid can switch to an islanded mode when there is a disturbance at the main grid distribution network. The microgrid can be resynchronized with the utility system when the disturbance is removed. The time and duration of such disturbances, however, are not known to microgrids. Although microgrids are typically infrequently switched to the islanded mode, there can be significant social cost savings and load point reliability enhancements offered by microgrids during major outages (such as hurricanes) which can help to justify the islanding design as part of a microgrid planning decision.

Figure 1:
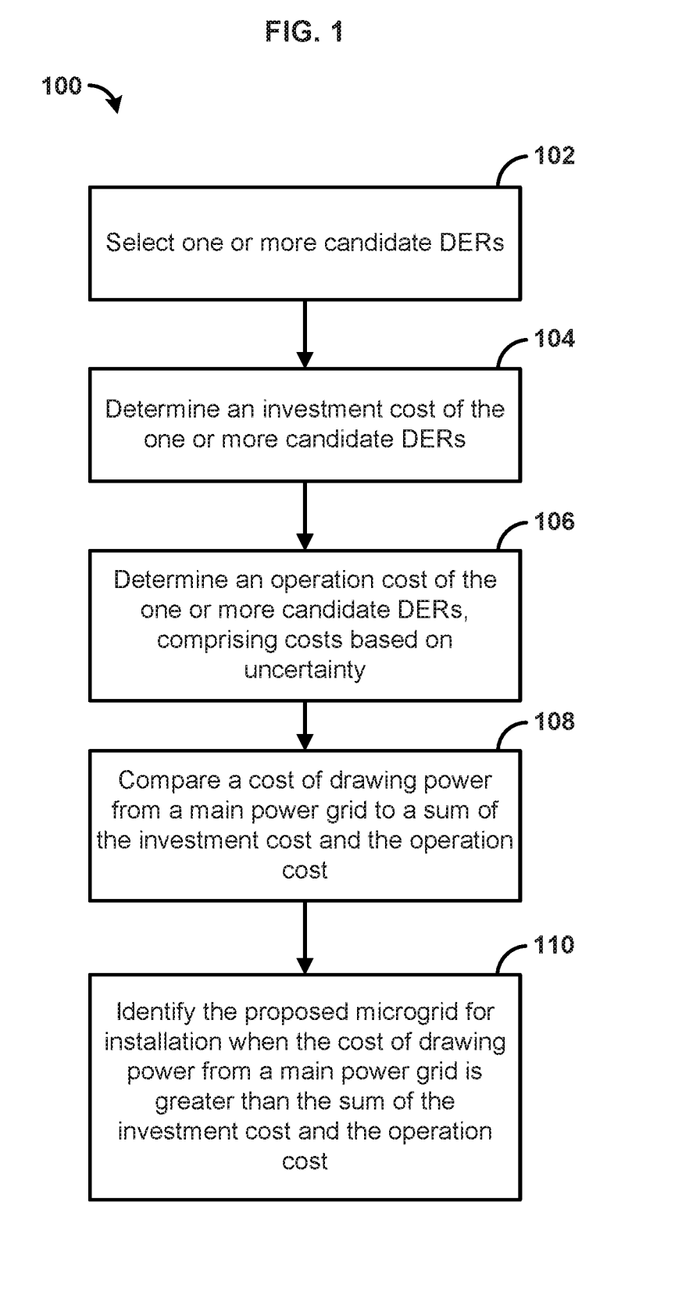
FIG. 1 is a flowchart illustrating an exemplary method.

FIG. 1 is a flowchart showing example method 100. At step 102, one or more candidate distributed energy resources (DERs) can be selected for use within a proposed microgrid. In some aspects, the one or more candidate DERs can be received at a computing device, such as a server, computer, a personal computer, a laptop computer, and the like. A DER can be any distributed energy resource (e.g., dispatchable and non-dispatchable DERs). A candidate DER can be a DER selected as a possible DER for deployment within a microgrid (e.g., selected by a user). In some aspects, an initial group of candidate DERs can be user-selected based on a user's preferences on technology and/or other considerations such as microgrid location and space limitations. As examples, a solar energy resource can be identified as a candidate DER if a microgrid is planned to be installed in a location with high solar radiation; a wind energy resource can be considered if there will be high levels of wind in the microgrid location. In an aspect, the selected distribution of candidate DERs can comprise a mix of dispatchable and non-dispatchable generation units and energy storage systems. In an aspect, a dispatchable unit can be a source of electricity that can be dispatched at the request of power grid operators; that is, generating units that can be turned on or off, or can adjust their power output on demand. In an aspect, non-dispatchable units can comprise, for example, variable renewable energy sources such as wind power and solar power which cannot be controlled by operators. In an aspect, the distribution of candidate DERs can be selected based on an expected load of the proposed microgrid. That is, the selected DERs can provide at least an amount of energy sufficient to satisfy the amount of load on the microgrid (e.g., the energy used by electricity customers). When the amount of energy provided by the microgrid is less than the expected load, the microgrid cannot provide islanding (e.g., isolation) functions supporting increased energy reliability if the main grid fails.

At step 104, an investment cost of the one or more candidate DERs can be determined. In some aspects, the computing device can be used to determine the investment cost. In an aspect, the investment cost of the one or more candidate DERs can comprise an investment cost of generating units and an investment cost of energy storage systems.

In an aspect, the investment cost of generating units (dispatchable and non-dispatchable) can be a function of the generating capacity of the generating units. In an aspect, the investment cost of generating units can be determined according to the expression:

$$Cost_{Generation} = \sum_t \sum_{i \in (G,W)} \kappa_t CC_{it} P_i^{max} x_i$$

Computed yearly (t) over the set of all DERs i including all dispatchable units G and all non-dispatchable units W (e.g., all generating units). The variable CC can be an annualized investment cost for a DER, $P^{max}$ can be the rated power of a DER, $\kappa$ can be a coefficient of present-worth value and x can be a DER investment cost. The coefficient of the present worth $\kappa$ can be obtained from an annual discount rate d as $\kappa_t = 1/(1+d)^{t-1}$. The annual discount rated expresses the amount of interest paid/earned as a percentage of the balance at the end of the (annual) period. The DER investment cost x can be a binary variable that indicates whether or not a particular DER is installed. For example, if a specific DER is installed the associated DER Investment cost x can have a value of 1, while if the particular DER is not installed the associated x can have a value of 0. Using this variable, only the investment cost of installed DERs will be considered in $Cost_{Generation}$.

The investment cost of energy storage systems can be a function of the rated power and rated energy storage capacity. In an aspect, the investment cost for energy storage systems can be determined according to the equation:

$$Cost_{Storage} = \sum_t \sum_{i \in S} \kappa_t (CP_{it} P_i^{max} + CE_{it} C_i^{max}) x_i$$

Computed yearly (t) over the set of all DERs i including all energy storage systems S (e.g., all storage units). The variable CP can be an annualized investment cost for power storage within a DER, $P^{max}$ can be the rated power of a DER, the variable CE can be an annualized investment cost for energy storage within a DER, $C^{max}$ can be the rated capacity of energy storage of a DER, $\kappa$ can be a coefficient of present-worth value and x can be the DER investment cost.

The investment cost of the one or more candidate DER can comprise a sum of the investment cost of generating units ($Cost_{Generation}$) and the investment cost of energy storage systems ($Cost_{storage}$).

At step 106, a microgrid operation cost can be determined. In some aspects, the computing device can determine the microgrid operation cost. The microgrid operation cost can comprise a sum of the operation cost of DERs in the microgrid, the cost of energy purchases from the main grid, and the cost of unserved energy. In an aspect, the operation cost can further comprise costs based on one or more uncertainty factors.

In an aspect, the operation cost of DERs in the microgrid can comprise a generation cost for non-dispatchable units and a generation cost, for dispatchable units. The generation cost of non-dispatchable units and energy storage systems can be assumed to be zero. A single-step price curve can be considered for other DERs (e.g., dispatchable units). In an aspect, the operation cost for dispatchable units can be determined using the expression:

$$Cost_{Operation} = \sum_t \sum_h \sum_b \sum_{i \in G} \kappa_t c_i P_{Pihbt}$$

Computed hourly (t indicates year, h indicates day, and b indicates hour) for each DER i included in the set of dispatchable units G. The variable c can be the generation price and the variable P can be a set of primal variables The set of primal variables can refer to unknown values to be determined (e.g., DER power output, main grid power, DER investment state, load curtailment, etc.). In mathematical optimization theory, every linear optimization problem can be viewed as a primal problem (which is typically a minimization). Variables (unknowns) in the primal problem are called primal variables.

The cost of energy purchases from the main grid can be defined based on the amount of purchased energy and the market price of energy (e.g., at the point of common coupling). In an aspect the cost of energy purchase can be determined according to the formula:

$$Cost_{Purchase} = \sum_t \sum_h \sum_b \kappa_t \rho_{bht} P_{M,bht}$$

Computed hourly (t indicates year, h indicates day, and b indicates hour), where $\rho$ can indicate a market price of energy at a particular hour and $P_M$ can indicate a flow of main grid power. In an aspect the flow of main grid power $P_M$ can be negative if the microgrid is exporting excess power to the main grid (paid at market price).

The cost of unserved energy can be defined based on a load curtailment quantity and a value of lost load (VOLL). The VOLL can be an energy price for compensating curtailed customers, which can depend on several factors, such as a customer type, a quantity and duration of curtailment, and a time of outage. A higher VOLL can correspond to a more critical load (e.g., a more important customer type, a larger curtailment, a longer-duration curtailment, an outage at a peak time, etc.). In an aspect, the cost of unserved energy can be calculated according to the expression:

$$Cost_{Unserved} = \sum_t \sum_h \sum_b \kappa_t v_{bht} LS_{bht}$$

Computed hourly (t indicates year, h indicates day, and b indicates hour), where LS can indicate a load curtailment, v can indicate a VOLL, and $\kappa$ can indicate a coefficient of present-worth value. The load curtailment LS can represent the amount of load curtailment (e.g., power outage in terms of Watts) that can happen if adequate power cannot be transferred from the main grid. The VOLL v is the energy price (e.g., in terms of dollars per Watt-hour) that can be encountered in case of power outage. The VOLL is not necessarily actual money that will be paid/received, but can represent money that customers are willing to pay to avoid any power outage. Thus the load curtailment and VOLL can be used to monetize power outage. In some aspects, the VOLL v can be known for various types of customers based on available studies. As examples, critical infrastructure which is sensitive to power outage can have large values for v, as the power outage is particularly undesirable; while residential customers may have relatively small values for v as they can tolerate power outages without encountering significant inconvenience.

In an aspect, the present-worth value component K can be used to determine a discounted cost for a component as the component ages. For example, the value of K can be given according to the equation:

$$\kappa_t = \frac{1}{(1+d)^{t-1}}$$

Where d can be a discount rate and t can be an index indicating a year. In an aspect, the value $\kappa$ can be the same as determined above.

In an aspect, the microgrid operation cost can comprise a sum of the operation cost of DERs in the microgrid ($Cost_{Operation}$), the cost of energy purchases from the main grid ($Cost_{Purcahse}$), and the cost of unserved energy ($Cost_{Unserved}$).

In an aspect, a goal is to minimize the microgrid operation cost (e.g., the operation cost of the DERs, the cost of energy purchases from the main grid, and the cost of unserved energy. To achieve this goal, a sum of net power output by dispatchable and non-dispatchable units, a net power output by the energy storage systems, and a power transfer from the main grid matches an hourly load of the microgrid. The net power output of the dispatchable and non-dispatchable units can be positive (generating power) or zero (idle). Power generated by dispatchable units can be subject to generation capacity limits. Power generated by non-dispatchable units can be obtained based on a forecast. A net output power of an energy storage system can be positive (discharging), negative (charging) or zero (idle). The net output power of an energy storage system is subject to charging and discharging limits. Factors affecting the charging limits and discharging limits can comprise a state of charge (SOC) of the energy storage unit, an amount of charged or discharged power, an energy storage efficiency, and a capacity limit of the energy storage device. The power transferred from the main grid can be positive (importing), negative (exporting) or zero. Power transfer with the main grid can be limited by flow limits of a line connecting the microgrid to the main grid. A goal of the system can be to supply the hourly load of the microgrid while reducing cost of supplying the power, relative to the cost of purchasing all power from the main grid.

In an aspect, determining the microgrid operation costs to meet the forecasted hourly load of the microgrid can comprise identifying one or more uncertainty parameters. Each of the uncertainty parameters can reflect an unknown variable. As examples, the one or more uncertainty parameters can comprise one or more of a market price for energy, a generation rate of renewable energy at the DERs, and an uptime percentage of the main power grid, variable renewable energy (e.g., weather conditions required for solar and/or wind power), microgrid load, islanding, and other uncertain variables.

In an aspect, an option can be used to limit freedom of the one or more uncertainty parameters. The option can adjust solution robustness against uncertainties by limiting a maximum number of uncertain parameters which can reach their bounds. For example, an option of 1000 allows an uncertainty parameter associated with a type of uncertainty to obtain a value at its bounds (either upper or lower) for at most 1000 hours. In the remaining hours, forecasted values will be used for the uncertainty parameter. Using the option to limit uncertainty, a solution degree of conservatism can be controlled based on a user's tolerance for risk. As an example, three levels of risk-aversion can be considered: conservative, moderate, and aggressive. A larger option value translates into a more robust solution against uncertainties, and accordingly a larger investment cost (e.g., a more conservative solution). A smaller option value results in a less robust solution, as it considers fewer uncertainties in the planning process, and thus represents an aggressive solution. A moderate solution is represented by an option value in between. A conservative solution will result in a larger investment cost and a reduced cost of unserved energy. The investment cost of an aggressive solution will be lower, while the cost of unserved energy will be increased. Uncertainty options can be considered for, as examples, variable renewable energy, load, market price, islanding, and other uncertain variables.

At step 108, a cost of drawing power from a main power grid can be compared to a sum of the investment cost of the one or more candidate DERs and the microgrid operation cost. In an aspect, the cost of drawing power from a main grid can be determined based on an hourly forecast of the market price of power at the point of common coupling and an hourly forecast of a load of the microgrid. That is, the cost of providing all power for the microgrid from the main power grid. In an aspect, the investment cost of the one or more candidate DERs can be the cost determined in step 104. The microgrid operation cost can be the cost determined in step 106. In an aspect, forecast data providing the hourly forecast of the market price of power and/or the hourly forecast of a load of the microgrid can be provided by a server computer in communication with the computing device.

At step 110, the proposed microgrid can be identified for installation when the sum of the investment cost of the one or more candidate DERs and the microgrid operation cost is less than the cost of drawing power from the main power grid. In some aspect, the computing device can provide an output that identifies whether the microgrid should be installed. In an aspect, the cost of drawing power from the main power grid can be required to exceed the sum of the investment cost of the one or more candidate DERs and the microgrid operation cost by a predefined threshold before the proposed microgrid can be identified for installation. For example, the predefined threshold could represent a 2% savings relative to the cost of drawing power from the main power grid to justify the installation of the proposed microgrid.

In another aspect, if the sum of the investment cost of the one or more candidate DERs and the microgrid operation cost exceeds the cost of drawing power from the main grid, it can be determined that the proposed microgrid is not profitable for the planning horizon. Accordingly, a new batch of candidate DERs can be selected, and the process can be repeated.

In some aspects, when the proposed microgrid is identified for installation, the computing device can cause construction of one or more elements (e.g., one or more DERs) of the proposed microgrid. In other aspects, when the proposed microgrid has already been constructed, the computing device can cause activation and/or deactivation of one or more elements of the microgrid based on the identified DERs.

Figure 2:
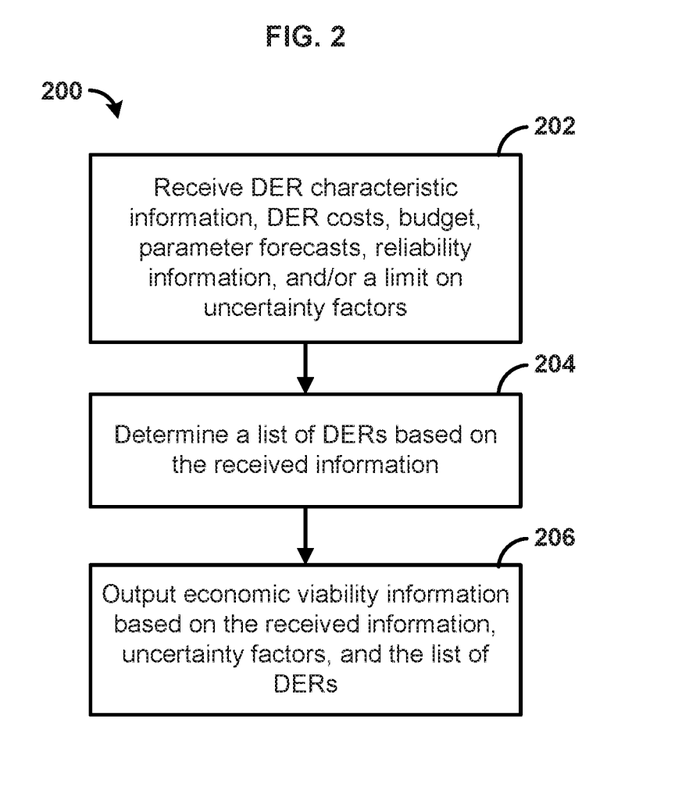
FIG. 2 is a flowchart illustrating another exemplary method.

FIG. 2 is a flowchart showing example method 200. At step 202, one or more of characteristic information regarding one or more candidate distributed energy resources (DERs), costs related to one or more candidate DERs, a total budget, forecasts regarding energy costs, a budget, reliability levels, and a limit on uncertainty factors can be received. In some aspects, the characteristic information regarding one or more candidate DERs, the costs related to one or more candidate DERs, the total budget, the forecasts regarding energy costs, the budget, the reliability levels, and/or the limit on uncertainty factors can be received at a computing device, such as a server computer, a personal computer, a laptop computer, or the like. In an aspect, one or more of the characteristic information regarding one or more candidate DERs, the costs related to one or more candidate DERs, the total budget, the forecasts regarding energy costs, the budget, the reliability levels, and the limit on uncertainty factors can be provided from a server computer. In some aspects, each item of information can be provided separately.

In an aspect, the characteristic information regarding one or more DERs can comprise a minimum energy output capacity, a maximum energy output capacity, a ramp rate, a minimum uptime, a minimum downtime, and/or other factors that characterize the operation of the one or more DERs. In an aspect, the costs related to the one or more candidate DERs can comprise an investment cost, an operation cost, a startup cost, a shutdown cost, and/or any other costs associated with purchase, maintenance, or operation of the one or more DERs.

The total budget can comprise a dollar (or any other currency) figure representing a total amount of money to be spent on microgrid investments and operations during a planning horizon of the microgrid. For example, the planning horizon can be a time period in the range of 10 to 20 years. The forecasts regarding energy costs can comprise price estimates for energy prices, such as costs to purchase power from the main grid, generation rates for renewable energy sources (e.g., wind, solar, etc.).

The reliability levels can represent a risk tolerance of economic viability assessment. In particular, the reliability levels can indicate a forecasted reliability of the DERs. As an example, three levels of risk tolerance can be considered: conservative, moderate, and aggressive. The conservative risk tolerance can be considered to require economic viability of the proposed microgrid even with a relatively high degree of uncertainty. The aggressive risk tolerance can consider relatively less uncertainty, relying on forecast values to a larger extent. The moderate risk tolerance can rely on relatively higher uncertainty than the aggressive risk tolerance, but relatively less uncertainty than the conservative risk tolerance. In an aspect, the reliability levels can represent a number of uncertain variables.

The limits on uncertainty can be related to the reliability levels. In an aspect, the limits on uncertainty are imposed to limit freedom of one or more uncertainty parameters. The limits on uncertainty adjust solution robustness against uncertainties by limiting a maximum number of uncertain parameters which can reach their bounds. For example, a limit on uncertainty option of 1000 allows an uncertainty parameter associated with a type of uncertainty to obtain a value at its bounds (either upper or lower) for at most 1000 hours. In the remaining hours, forecasted values will be used for the uncertainty parameter. Using the limit on uncertainty, the reliability levels can be controlled based on a user's tolerance for risk.

In an aspect, the one or more uncertainty parameters can comprise one or more of a market price for energy, a generation rate of renewable energy at the DERs, and an uptime percentage of the main power grid, variable renewable energy (e.g., weather conditions required for solar and/or wind power), microgrid load, islanding, and other uncertain variables. Each of the uncertainty parameters can reflect an unknown variable. In some aspects, two types of uncertainties can be present in this problem: forecasting-related and islanding-related. The forecasting-related uncertainty parameters can be reflected by uncertainties in the forecasts received. The islanding-related uncertainties can refer to main grid interruptions (e.g., down times) in which power cannot be transferred from the main grid to the microgrid. In these cases, the time and the duration of the islanding can be uncertain.

At step 204, a list of DERs can be determined based on the one or more candidate distributed energy resources, the characteristic information, and the costs. In some aspect, the computing device can determine the list of DERs. In an aspect, the list of DERs can be selected to reduce microgrid operation cost (e.g., the operation cost of the DERs, the cost of energy purchases form the main grid, and the cost of unserved energy) as compared to purchasing power from the main grid. For example, the list of DERs can be selected to minimize the microgrid operation cost. To achieve this goal, a sum of net power output by DERs (e.g., net power output by dispatchable and non-dispatchable units and a net power output by the energy storage systems) and a power transfer from the main grid can be selected such that the sum matches an hourly load of the microgrid. The net power output of the dispatchable and non-dispatchable units can be positive (generating power) or zero (idle). The power generated by dispatchable units can subject to generation capacity limits. The power generated by non-dispatchable units can be obtained based on a forecast. A net output power of an energy storage system can be positive (discharging), negative (charging) or zero (idle). The net output power of an energy storage system is subject to charging and discharging limits. Factors affecting the charging limits and discharging limits can comprise a state of charge (SOC) of the energy storage unit, an amount of charged or discharged power, an energy storage efficiency, and a capacity limit of the energy storage device. The power transferred from the main grid can be positive (importing), negative (exporting) or zero. Power transfer with the main grid can be limited by flow limits of a line connecting the microgrid to the main grid.

In an aspect, the list of DERs can be determined such that the power generated by the DERs can forecasted to meet or exceed a forecast hourly load of the microgrid. In some aspects, microgrids can be normally connected to the main grid, such that if main grid power is cheaper than locally generated power, the microgrid can purchase power from the main grid to supplement power generated by DERs. If the main grid power is more expensive than the locally generated power, the microgrid can use power generated by local DERs to supply its loads and can sell any excess generated power back to the main grid. In either case, the amount of power transfer with the main grid can be determined via an optimization model in a way that the microgrid total planning cost is minimized. In an aspect, the systems and methods provided can also be used to determine whether the microgrid should purchase power from the main grid or provide power from the microgrid DERs. In an aspect, the list of DERs can comprise a number of dispatchable units and a number of non-dispatchable units. The non-dispatchable units determined in the list of DERs can be subject to uncertainty and power generation can be forecasted based on, for example, weather forecasts in the case of wind or solar power non-dispatchable units. Accordingly, the exact hourly power generation provided by the list of DERs is not known and can be determined by the microgrid planning optimization model.

At step 206, economic viability information related to a microgrid can be output based on the received input, the determined list of DERs, and one or more uncertainty factors. In an aspect, the economic viability information can comprise one or more of a rate of return, an estimated total annual cost of the microgrid, an estimated total annual revenue of the microgrid, and an indication of whether the rate of return on investments is less than the lifetime of assets used to build the microgrid. The estimated total annual cost of the microgrid can comprise, for example, annualized investment costs of the DERs, operating costs of the DERs computed hourly, the hourly cost of purchasing power from the main grid at a point of common coupling, and a cost of unserved energy. The estimated total annual revenue of the microgrid can comprise, for example, economic benefits from selling excess power to the grid at hourly market rates and monetized reliability improvements based on DER deployment. The rate of return can comprise an amount of time needed for the cost of the microgrid (e.g., investment costs to deploy DERs and operational costs to operate the DERs) to fall below the costs of purchasing energy from the main grid. As an example, the investment costs for a microgrid can be relatively high, while operation of the microgrid allows the users to utilize local resources for energy generation at times when purchasing power from the main grid is expensive, effectively hedging for local loads against high market prices for energy. Accordingly, it can take one or more years of operation to recover the large investment costs for the microgrid. The rate of return on investment can comprise, for example, a number of years required for a sum of the estimated annual revenue of the microgrid to be greater than a sum of the estimated annual cost of the microgrid. Alternatively, the rate of return on investment can indicate a total revenue in a specified planning horizon (e.g., 10-20 years). In some aspects, additional outputs can comprise the investment state of each DER, the hourly generation of each DER, and the power transfer with the main grid. The indication of whether the rate of return on investments is less than the lifetime of assets used to build the microgrid can indicate whether the DERs and/or other infrastructure required to deploy the microgrid is likely to deteriorate prior to receiving a returned profit on the deployed microgrid.

In an aspect, the economic viability information can comprise an indication of whether the microgrid deployment is likely to be economically viable. For example, whether a difference between the non-microgrid operation cost (e.g., the cost of purchasing power from the main grid) and the cost of microgrid operation exceeds the cost of microgrid investment.

In some aspects, the computing device can cause construction of one or more elements (e.g., one or more DERs) of the proposed microgrid in response to the output economic viability information. In other aspects, when the proposed microgrid has already been constructed, the computing device can cause activation and/or deactivation of one or more elements of the microgrid based on the output economic viability information.

Figure 3:
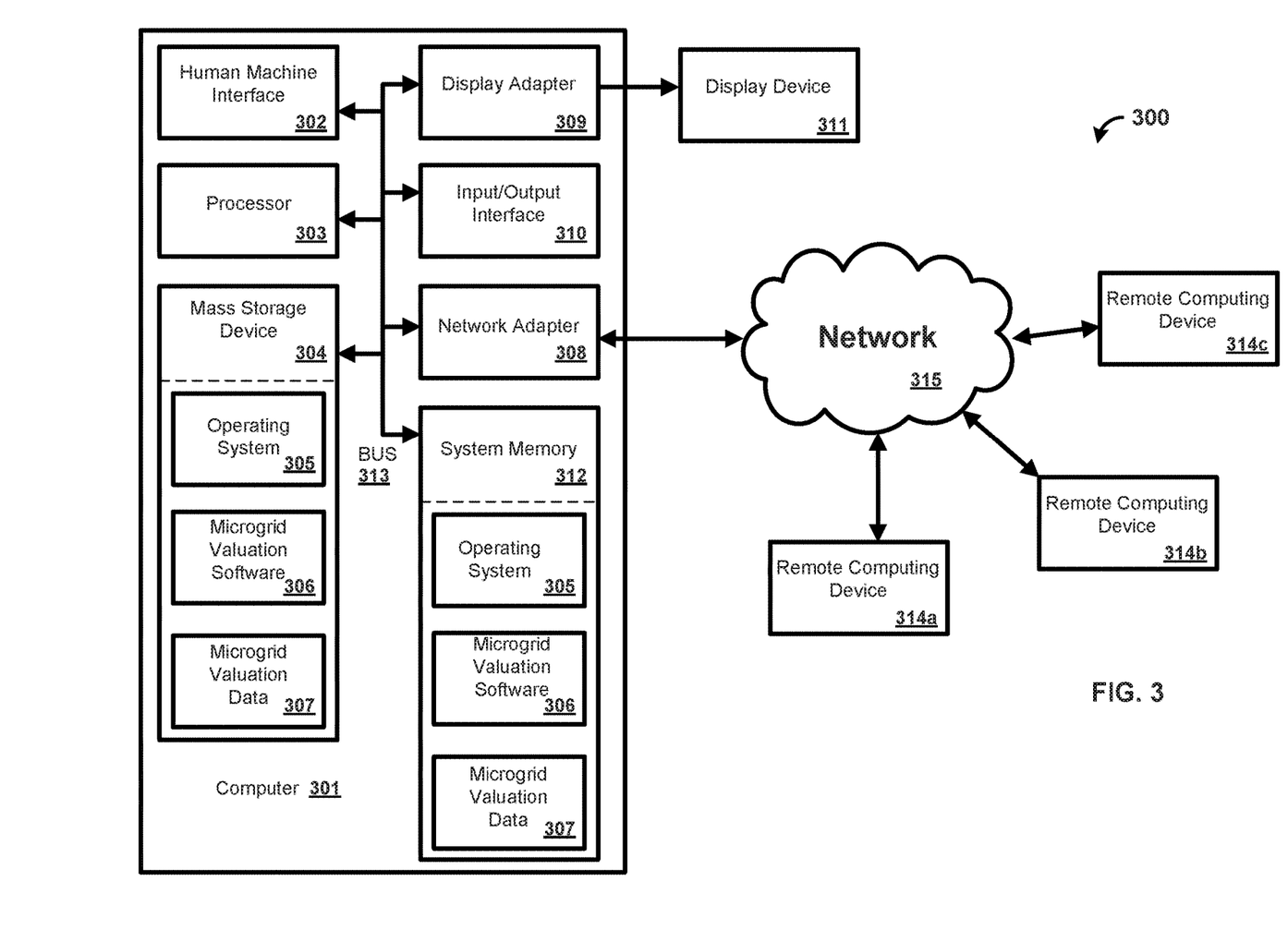
FIG. 3 is a block diagram of an exemplary computing device.

In an exemplary aspect, the methods and systems can be implemented on a computer 301 as illustrated in FIG. 3 and described below. Similarly, the methods and systems disclosed can utilize one or more computers to perform one or more functions in one or more locations. FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors 303, a system memory 312, and a system bus 313 that couples various system components including the one or more processors 303 to the system memory 312. The system can utilize parallel computing.

The system bus 313 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this description can also be implemented over a wired or wireless network connection and each of the subsystems, including the one or more processors 303, a mass storage device 304, an operating system 305, microgrid valuation software 306, microgrid valuation data 307, a network adapter 308, the system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as the microgrid valuation data 307 and/or program modules such as the operating system 305 and the microgrid valuation software 306 that are immediately accessible to and/or are presently operated on by the one or more processors 303.

In another aspect, the computer 301 can also comprise other removable/non-removable, volatile/non-volatile computer storage media. By way of example, FIG. 3 illustrates the mass storage device 304 which can provide non-volatile storage of computer code, computer readable instructions, data structures, program modules, and other data for the computer 301. For example and not meant to be limiting, the mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, the operating system 305 and the microgrid valuation software 306. Each of the operating system 305 and the microgrid valuation software 306 (or some combination thereof) can comprise elements of the programming and the microgrid valuation software 306. The microgrid valuation data 307 can also be stored on the mass storage device 304. The microgrid valuation data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 303 via the human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, the display device 311 can also be connected to the system bus 313 via an interface, such as the display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via the Input/Output Interface 310. Any step and/or result of the methods can be output in any form to an output device. Such output can be any form of visual representation, including, but not limited to, textual, graphical, animation, audio, tactile, and the like. The display 311 and computer 301 can be part of one device, or separate devices.

The computer 301 can operate in a networked environment using logical connections to one or more remote computing devices 314a,b,c. By way of example, a remote computing device can be a personal computer, portable computer, smartphone, a server, a router, a network computer, a peer device or other common network node, and so on. Logical connections between the computer 301 and a remote computing device 314a,b,c can be made via a network 315, such as a local area network (LAN) and/or a general wide area network (WAN). Such network connections can be through the network adapter 308. The network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the one or more processors 303 of the computer. An implementation of the microgrid valuation software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an aspect, the computing device 301, executing the microgrid valuation software 306, can be configured to select one or more candidate DERs for use within a proposed microgrid. In an aspect, the selection can be based on, for example, user input of selected DERs.

The microgrid valuation software 306 can further determine an investment cost of the one or more candidate distributed energy resources. In an aspect, the investment cost of the one or more candidate DERs can comprise an investment cost of generating units and an investment cost of energy storage systems. In an aspect, the investment cost of generating units (dispatchable and non-dispatchable) is a function of their generating capacity. The investment cost of energy storage systems can be a function of the rated power and rated energy storage capacity.

The computer 301, using the microgrid valuation software 306 and microgrid valuation data 307, can further determine an operation cost of the one or more candidate distributed energy resources. The microgrid operation cost can comprise the operation cost of DERs in the microgrid, the cost of energy purchases from the main grid, and the cost of unserved energy.

In an aspect, the operation cost of DERs in the microgrid can comprise a generation cost for non-dispatchable units and a generation cost, for dispatchable units. The generation cost of non-dispatchable units and energy storage systems can be assumed to be zero. A single-step price curve can be considered for other DERs (e.g., dispatchable units). The cost of energy purchase can be defined based on the amount of purchased energy and the market price of energy (e.g., at the point of common coupling). The cost of unserved energy can be defined based on a load curtailment quantity and a value of lost load (VOLL). The VOLL can be an energy price for compensating curtailed customers, which can depend on several factors, such as a customer type, a quantity and duration of curtailment, and a time of outage. A higher VOLL can correspond to a more critical load (e.g., a more important customer type, a larger curtailment, a longer-duration curtailment, an outage at a peak time, etc.).

In an aspect, The microgrid operation cost can comprise a sum of the operation cost of DERs in the microgrid ($Cost_{Operation}$), the cost of energy purchases from the main grid ($Cost_{Purcahse}$), and the cost of unserved energy ($Cost_{Unserved}$).

In an aspect, a goal is to minimize the microgrid operation cost (e.g., the operation cost of the DERs, the cost of energy purchases form the main grid, and the cost of unserved energy. To achieve this goal, a sum of net power output by dispatchable and non-dispatchable units, a net power output by the energy storage systems, and a power transfer from the main grid matches an hourly load of the microgrid. The net power output of the dispatchable and non-dispatchable units can be positive (generating power) or zero (idle). Power generated by dispatchable units can subject to generation capacity limits. Power generated by non-dispatchable units can be obtained based on a forecast. A net output power of an energy storage system can be positive (discharging), negative (charging) or zero (idle). The net output power of an energy storage system is subject to charging and discharging limits. Factors affecting the charging limits and discharging limits can comprise a state of charge (SOC) of the energy storage unit, an amount of charged or discharged power, an energy storage efficiency, and a capacity limit of the energy storage device. The power transferred from the main grid can be positive (importing), negative (exporting) or zero. Power transfer with the main grid can be limited by flow limits of a line connecting the microgrid to the main grid. A goal of the system can be to supply the hourly load of the microgrid while reducing cost of supplying the power, relative to the cost of purchasing all power from the main grid.

In an aspect, determining the microgrid operation costs to meet the forecasted hourly load of the microgrid can comprise identifying one or more uncertainty parameters. Each of the uncertainty parameters can reflect an unknown variable. As examples, the one or more uncertainty parameters can comprise one or more of a market price for energy, a generation rate of renewable energy at the DERs, and an uptime percentage of the main power grid, variable renewable energy (e.g., weather conditions required for solar and/or wind power), microgrid load, islanding, and other uncertain variables.

In an aspect, a limit on uncertainty option is imposed to limit freedom of the one or more uncertainty parameters. The limit on uncertainty option adjusts solution robustness against uncertainties by limiting a maximum number of uncertain parameters which can reach their bounds. For example, a limit on uncertainty option of 1000 allows an uncertainty parameter associated with a type of uncertainty to obtain a value at its bounds (either upper or lower) for at most 1000 hours. In the remaining hours, forecasted values will be used for the uncertainty parameter. Using the limit on uncertainty, a solution degree of conservatism can be controlled based on a user's tolerance for risk. As an example, three levels of risk-aversion can be considered: conservative, moderate, and aggressive. A larger limit on uncertainty translates into a more robust solution against uncertainties, and accordingly a larger investment cost (e.g., a more conservative solution). A smaller limit on uncertainty results in a less robust solution, as it considers fewer uncertainties in the planning process, and thus represents an aggressive solution. A moderate solution is represented by a level of uncertainty in between. A conservative solution will result in a larger investment cost and a reduced cost of unserved energy. The investment cost of an aggressive solution will be lower, while the cost of unserved energy will be increased. Uncertainty options can be considered for, as examples, variable renewable energy, load, market price, islanding, and other uncertain variables The microgrid valuation software 306 can further be configured to compare a cost of drawing power from a main power grid to a sum of the investment cost and the operation cost, and to identify the proposed microgrid for installation when the sum of the investment cost and the operation cost is less than the cost of drawing power from the main power grid.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a computing device, one or more candidate distributed energy resources for use within a proposed microgrid;
   determining, based on a generating capacity and a rated power associated with each candidate distributed energy resource of the one or more candidate distributed energy resources, an investment cost of the one or more candidate distributed energy resources;
   determining one or more weather conditions associated with the proposed microgrid, one or more islanding conditions associated with the proposed microgrid, and one or more uncertainty parameters associated with the proposed microgrid;
   determining, based on the one or more weather conditions, the one or more islanding conditions, and the one or more uncertainty parameters, an operation cost of the one or more candidate distributed energy resources;
   comparing a cost of drawing power from a main power grid to a sum of the investment cost and the operation cost;
   identifying the proposed microgrid for installation when the sum of the investment cost and the operation cost is less than the cost of drawing power from the main power grid; and
   constructing, based on the cost comparison, the proposed microgrid.

2. The method of claim 1, wherein the investment cost of the one or more candidate distributed energy resources is based on at least one of an energy generating capacity of the one or more candidate distributed energy resources, an energy storage capacity of the one or more candidate distributed energy resources, and a projected operation cost of the one or more candidate distributed energy resources.

3. The method of claim 1, wherein determining the operation cost of the one or more candidate distributed energy resources comprises:
   determining energy needs for the proposed microgrid such that energy provided by the one or more candidate distributed energy resources and power from the main grid matches an hourly load on the proposed microgrid; and
   determining operation costs to meet the determined energy needs.

4. The method of claim 3, wherein determining the operation costs to meet the determined energy needs comprises forecasting a cost of energy per hour and an energy need per hour.

5. The method of claim 3, wherein determining the operation costs to meet the determined energy needs comprises incorporating one or more uncertainty parameters.

6. The method of claim 5, wherein the one or more uncertainty parameters comprise one or more of a market price for energy, a generation of renewable energy at the one or more candidate distributed energy resources, and an uptime percentage of the main power grid.

7. The method of claim 6, wherein a limit is placed on the one or more uncertainty parameters.

8. The method of claim 1, wherein when the sum of the investment cost and the operation costs is greater than the cost of drawing power from the main power grid, a new selection of one or more candidate distributed energy resources is generated.

9. A method comprising:
receiving, by a computing device, an input comprising a proposed microgrid;
determining, by the computing device, based on the proposed microgrid: one or more of characteristic information regarding one or more candidate distributed energy resources, costs related to one or more candidate distributed energy resources, a total budget, parameter forecasts, reliability levels, and a limit on uncertainty factors;
determining one or more weather conditions associated with the proposed microgrid, one or more islanding conditions associated with the proposed microgrid, and one or more uncertainty factors associated with the proposed microgrid;
selecting, from the one or more candidate distributed energy resources, based on the one or more weather conditions, the one or more islanding conditions, the characteristic information, the costs, and the one or more uncertainty factors and the limit on uncertainty factors, a list of distributed energy resources;
outputting economic viability information related to the proposed microgrid based on the received input, uncertainty factors, and the list of distributed energy resources; and
activating, based on the cost comparison, the proposed microgrid.

10. The method of claim 9, wherein determining the list of distributed energy resources comprises selecting one or more candidate distributed energy resources, such that one or more of an investment cost for the one or more candidate distributed energy resources and an operation cost of the one or more candidate distributed energy resources is minimized, and energy produced by the one or more candidate distributed energy resources is sufficient to provide power for the proposed microgrid.

11. The method of claim 9, wherein the limit on uncertainty factors comprises one or more of a value limit on the forecasts, limits on the reliability levels, and a time period for which a variable can be at a limit.

12. The method of claim 9, wherein the economic viability information comprises one or more of a rate of return, an estimated total annual cost of the proposed microgrid, an estimated total annual revenue of the proposed microgrid, and an indication of whether the rate of return on investments is less than a lifetime of assets used to build the proposed microgrid.

13. A system comprising:
a memory having computer-executable instructions encoded thereon; and
a processor functionally coupled to the memory and configured, by the computer-executable instructions, for:
determining one or more candidate distributed energy resources for use within a proposed microgrid;
determining, based on a generating capacity and a rated power associated with each candidate distributed energy resource of the one or more candidate distributed energy resources, an investment cost of the one or more candidate distributed energy resources;
determining one or more weather conditions associated with the proposed microgrid, one or more islanding conditions associated with the proposed microgrid, and one or more uncertainty parameters associated with the proposed microgrid;
determining, based on the one or more weather conditions, the one or more islanding conditions, and the one or more uncertainty parameters an operation cost of the one or more candidate distributed energy resources;
comparing a cost of drawing power from a main power grid to a sum of the investment cost and the operation cost;
identifying the proposed microgrid for installation when the sum of the investment cost and the operation cost is less than the cost of drawing power from the main power grid; and
constructing, based on the cost comparison, the proposed microgrid.

14. The system of claim 13, wherein the investment cost of the one or more candidate distributed energy resources is based on at least one of an energy generating capacity of the one or more candidate distributed energy resources, an energy storage capacity of the one or more candidate distributed energy resources, and a projected operation cost of the one or more candidate distributed energy resources.

15. The system of claim 13, wherein the computer-executable instructions configured for determining the operation cost of the one or more candidate distributed energy resources are further configured for:
determining energy needs for the proposed microgrid such that energy provided by the one or more candidate distributed energy resources and power from the main grid matches an hourly load on the proposed microgrid; and
determining operation costs to meet the determined energy needs.

16. The system of claim 15, wherein the computer-executable instructions configured for determining the operation costs to meet the determined energy needs are further configured for forecasting a cost of energy per hour and an energy need per hour.

17. The system of claim 15, wherein the computer-executable instructions configured for determining the operation costs to meet the determined energy needs are further configured for incorporating one or more uncertainty parameters.

18. The system of claim 17, wherein the one or more uncertainty parameters comprise one or more of a market price for energy, a generation of renewable energy at the one or more candidate distributed energy resources, and an uptime percentage of the main power grid.

19. The system of claim 17, wherein a limit is placed on the one or more uncertainty parameters.

20. The system of claim 13, wherein when the sum of the investment cost and the operation costs is greater than the cost of drawing power from the main power grid, a new selection of one or more candidate distributed energy resources is generated.

* * * * *